G. R. SMITH.
Soldering Irons.
No. 149,801. Patented April 14, 1874.
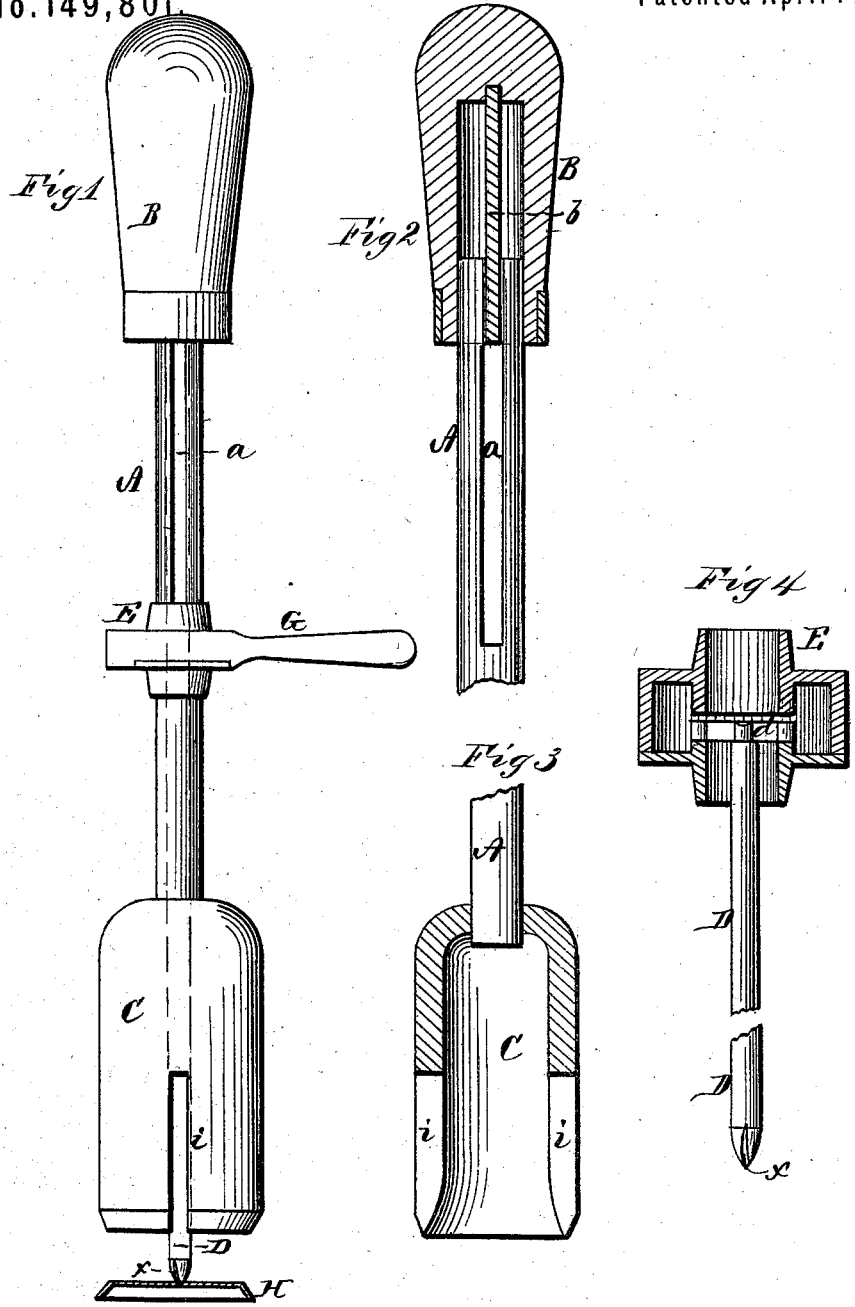
WITNESSES
Franck L. Durand
C. L. Evert
INVENTOR
George R. Smith
Alexander Mason
By
Attorneys.

UNITED STATES PATENT OFFICE.

GEORGE R. SMITH, OF BALTIMORE, MARYLAND.

IMPROVEMENT IN SOLDERING-IRONS.

Specification forming part of Letters Patent No. 149,801, dated April 14, 1874; application filed February 18, 1874.

*To all whom it may concern:*

Be it known that I, GEORGE R. SMITH, of Baltimore city and in the State of Maryland, have invented certain new and useful Improvements in Soldering-Iron; and do hereby declare that the following is a full, clear, and exact description thereof, reference being had to the accompanying drawings, and to the letters of reference marked thereon, making a part of this specification.

The nature of my invention consists in the construction and arrangement of a soldering-iron for soldering the round disks on the tops of fruit and other cans, as will be hereinafter more fully set forth.

In order to enable others skilled in the art to which my invention appertains to make and use the same, I will now proceed to describe its construction and operation, referring to the annexed drawing, in which—

Figure 1 is a side view of my soldering-iron. Figs. 2, 3, and 4 are detailed views of detached parts thereof.

A represents a hollow shaft of any suitable dimensions, provided on opposite sides with longitudinal slots $a$ $a$ extending from the upper end downward for a suitable distance. B represents the wooden handle provided with a hole or recess for the reception of the upper slotted end of the hollow shaft A. In the hole or recess of the handle B is secured a bar, $b$, which, when the shaft is inserted in the handle, enters the slots $a$ $a$, and prevents the same from contracting, or, in other words, prevents the two parts of the split portion of the shaft from jamming together. Upon the lower end of the shaft A is secured the soldering-cylinder C, made of copper or other suitable material, and its lower end made beveled both outside and inside, as shown in Fig. 3. The lower end of the cylinder C is provided with vertical slots $i$ $i$, extending upward from the lower edge for a suitable distance. Through the hollow shaft A passes a solid shaft, D, the lower end of which is pointed, as shown in Figs. 1 and 4. To the upper end of the shaft D is attached a cross-bar, $d$, which passes through the slots $a$ $a$ in the hollow shaft A, and into a groove in the interior of a hub, E. This hub slides up and down on the hollow shaft A, carrying with it the solid shaft D. The hub E is, on one side, provided with a handle, G.

The pointed shaft D being drawn up, the cylinder C is heated to the required temperature. The round plate H being placed over the round hole in the top of the can to be soldered, a drop of solder, more or less, is dropped on the edge thereof, after which the point of the shaft D is placed in the vent-hole in the plate H to hold said plate steady in its place. The cylinder C is then brought down and turned around, spreading the solder around the edge of the plate. The slots $i$ $i$ in the cylinder allow the air to enter in the same and cool the solder as fast as it is spread.

The vent-hole usually made in the plates H is to allow the gases or hot air generated by the application of hot solder within the can to escape, said hole being afterward closed by solder.

In inserting the pointed end of the solid shaft D in the vent-hole this object would be defeated, and to obviate this difficulty I make one or more grooves, $x$, in the point of the shaft, so as to allow free escape for the hot air or gases.

Having thus fully described my invention, what I claim as new, and desire to secure by Letters Patent, is—

1. The combination of the hollow shaft A with slots $a$ $a$, and handle B with bar $b$, substantially as and for the purposes herein set forth.

2. The combination of the pointed shaft D, cross-bar $d$, and grooved hub E with handle G, substantially as and for the purposes herein set forth.

In testimony that I claim the foregoing I have hereunto set my hand this 13th day of February, 1874.

GEORGE R. SMITH.

Witnesses:
 C. L. EVERT,
 A. N. MARR.